United States Patent [19]

Ulf

[11] 4,337,671
[45] Jul. 6, 1982

[54] APPARATUS FOR TRANSLATING ROTARY MOVEMENT TO RECTILINEAR MOVEMENT

[76] Inventor: Andersson P. Ulf, Lindetofta L4, S-53100 Lidköping, Sweden

[21] Appl. No.: 190,764
[22] PCT Filed: Jun. 5, 1979
[86] PCT No.: PCT/SE79/00127
§ 371 Date: Feb. 5, 1980
§ 102(e) Date: Jan. 18, 1980
[87] PCT Pub. No.: WO80/00032
PCT Pub. Date: Jan. 10, 1980

[30] Foreign Application Priority Data
Jun. 5, 1978 [SE] Sweden .................................. 7806574

[51] Int. Cl.³ .......................... F16H 1/18; F16H 27/02
[52] U.S. Cl. ................................ 74/424.8 C; 74/89.15
[58] Field of Search ................... 74/424.8 C, 424.8 R, 74/424.8 B, 89.15, 459

[56] References Cited
U.S. PATENT DOCUMENTS

| | | | |
|---|---|---|---|
| 2,734,392 | 2/1956 | Falk | 74/424.8 C |
| 2,780,740 | 2/1957 | Roman et al. | 74/424.8 R |
| 3,128,634 | 4/1964 | Eastman | 74/89.15 |
| 3,861,226 | 1/1975 | Stanley | 74/89.15 |
| 3,965,761 | 6/1976 | Stanley | 74/89.15 |
| 4,050,319 | 9/1977 | Stanley | 74/89.15 |

FOREIGN PATENT DOCUMENTS

| | | | |
|---|---|---|---|
| 1927767 | 3/1970 | Fed. Rep. of Germany | 74/424.8 C |
| 879530 | 2/1943 | France | 74/424.8 R |

Primary Examiner—Lawrence J. Staab
Attorney, Agent, or Firm—Blanchard, Flynn, Thiel, Boutell & Tanis

[57] ABSTRACT

Apparatus for translating rotary to linear motion using cylindrical means in the form of a shaft or cylinder with helical grooves, usually having a thread profile.

For obtaining good efficiency and large gear ratio, i.e. small linear movement per revolution, the apparatus has been made up from an outer cylinder (1) with a rear transverse portion (5) and a forward outer opening (3) through which an inner cylinder (11) is unrotatably displaceable.

The inner cylinder (11) has on its inside a helix groove (12) or thread, in which at least one profiled roller (30, 32, 40) with circular ridges (33) engages. The roller or rollers are eccentrically disposed at one end of a drive shaft (23), rotatably but axially undisplaceably mounted (8) in the outer cylinder (1) at its other end. When the shaft (23) rotates, the rollers (31, 32, 40) roll or follow in the grooves (12) of the inner cylinder (11) and displace the inner cylinder in the outer cylinder.

3 Claims, 5 Drawing Figures

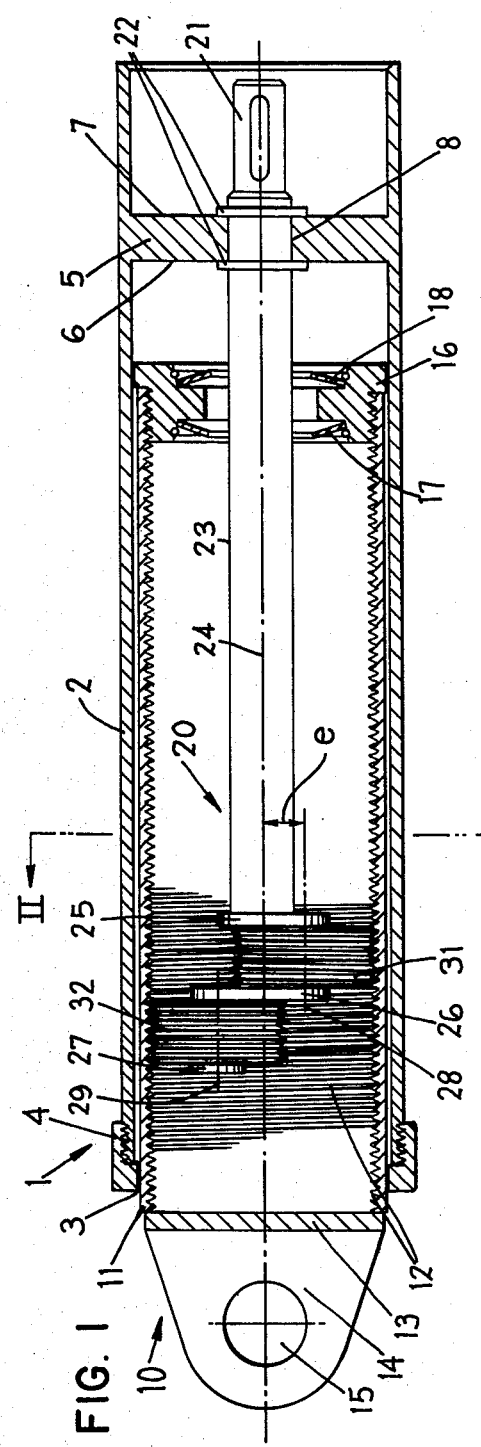
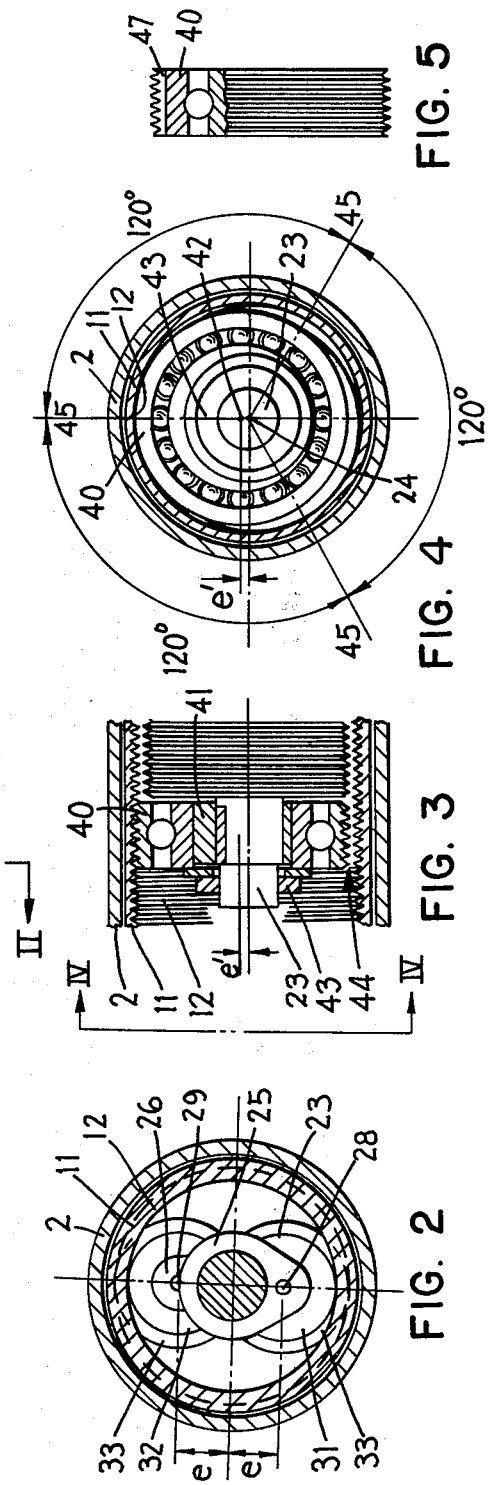

4,337,671

APPARATUS FOR TRANSLATING ROTARY MOVEMENT TO RECTILINEAR MOVEMENT

FIELD OF THE INVENTION

The present invention relates to an apparatus for translating rotary movement to rectilinear movement, using members with helical grooves or threads and profiled rolling bodies co-acting and engaging therewith.

BACKGROUND OF THE INVENTION

Amongst such apparatus ball nuts and screws, for example, are known in the prior art, and these have small friction but also the disadvantage that the gear reduction is small, i.e. there is a large linear displacement for each revolution of the rotary movement. Devices with screws and nuts are also known, and these devices can be given a large gear reduction, i.e. a small linear displacement for each revolution of the rotary movement. However, these devices have the disadvantage that they have large friction. Apparatus of the kind described are also often expensive.

The translating apparatus in accordance with the invention combines the best properties of the described known apparatus. The apparatus thus has low friction, i.e. good efficiency, at the same time enabling a large gear reduction.

The advantages stated are achieved in that a tubular outer cylinder, comprising an outer casing at one end having a transverse portion and at the other an end wall opening, surrounds an inner cylinder arranged therein, axially displaceable through the end wall opening of the outer cylinder but unrotatable in relation thereto, said inner cylinder comprising an inner casing with a cylindrical inner surface having a helical thread or helical groove, the outer cylinder having, preferably at the transverse portion thereof, a rotatably mounted but axially undisplacable driving means comprising a drive shaft extending axially concentric with the helical groove in the inner casing, and at its end opposite to the transverse portion of the outer cylinder having at least one eccentrically disposed cylindrical journal rigidly connected to said drive shaft, said journal carrying at least one rotatably mounted but axially undisplaceable cylindrical rolling body, a profiled rolling body, the outer cylindrical surface of which has annular ridges in a plane normal to said journal, e.g. with a thread profile, formed for complementary engagement with the helix grooves in the inner casing, the object being that when the drive shaft is rotated, the ridges on the axially undisplaceable profiled rolling bodies engage with the helix groove of the unrotatable inner casing and displace the inner cylinder axially and linearly, in relation to the outer cylinder a distance and direction depending on the pitch and direction of the helical groove.

Further advantages are obtained if the eccentric journal consists of an eccentric sleeve rigidly and undistortably attached to the drive shaft, and having a hole for accomodating the drive shaft, eccentrically disposed in relation to the journalling surface.

It is also advantageous to make the profiled rolling body as a rolling bearing, the outer surface of its outer ring having complementary ridges coacting and engaging with the helix groove.

It is even advantageous to make the apparatus so that the outer ring of the rolling bearing carries a separate sleeve, the outer periphery of which has the complementary ridges, or that the driving means comprises several profiled rolling bodies evenly distributed around the centre line of the drive shaft.

Other valuable advantages are obtained by the profiled rolling bodies being arranged for axial and radial adjustment on the eccentric journals, for the purpose of allowing said bodies to be tightened against each other for eliminating axial play between said bodies of the driving system and the helical groove or thread of the inner cylinder.

BRIEF DESCRIPTION OF THE DRAWINGS

The invention will now be described in connection with an embodiment and with reference to the accompanying drawing in which:

FIG. 1 is a longitudinal cross section of a complete unit embodying the invention;

FIG. 2 is a sectional view taken along the line II—II in FIG. 1;

FIG. 3 illustrates a portion of the apparatus according to an alternative preferred embodiment;

FIG. 4 is a sectional view of an apparatus with three profiled rolling bodies, seen in the direction IV—IV in FIG. 3; and FIG. 5 illustrates an alternative embodiment of a profiled rolling body.

DETAILED DESCRIPTION

The apparatus according to the invention consists of three main parts, an outer cylinder 1, an inner cylinder 10 and a driving unit 20.

From FIG. 1 it is apparent that the outer cylinder 1 consists of an outer casing or tube 2 with an opening 3 at one end. The opening 3, either in an end piece 4 or in the tube itself, is not formed circularly. The inner tube is glidably but nonrotatably taken through the opening 3. This can be achieved by the opening being formed as a polygon, by the outer surface of the inner casing being provided with a long key coacting with a keyway in the end wall piece 4, or in some other known mode. The outer casing 2 has, at its other end portion, a transverse portion 5 with front and back axially facing surfaces 6 and 7 and a centrally disposed cylindrical bearing surface 8.

At its rear end, the inner tube 11 has a sliding bushing 16. Sliding surfaces can alternatively be formed on the inner tube 11 itself. Conical disk springs 17, 18 can be mounted on the sliding bushing to function as buffers for the end positions of the inner cylinder. At the innermost position, the buffer 18 will come into contact with the transverse portion 5 and at the outmost position the buffer 17 will come into contact with an eccentric plate 25, described in detail below.

The inner casing 11 has at its outer end a transverse portion 13 to which are attached two lugs 14 each with holes 15. The driven member, e.g. a lever or arm, can be connected to the hole 15 therethrough by means of a pin (not shown).

The driving unit or driving system 20 comprises a drive shaft 23, rotatably mounted in the transverse portion 5 of the outer casing 2. A washer 22 bears against each surface 6 and 7 of said transverse portion 5, said washers being attached to the shaft 23 and thus prevent the drive shaft 23 from moving axially. Outside the transverse portion 5, one end of the drive shaft 23 is formed into a neck 21 for connecting to the rotary power movement.

The eccentric plate 25 is attached to the other end of the drive shaft 23, and carries a journal or pin 28 disposed eccentrically in relation to the axis of the shaft 23. The eccentricity between the centre line 24 of the shaft 23 and the centre line of the journal 28 is denoted by e in FIGS. 1 and 2. A profiled rolling body 31 is mounted on the journal 28, its outer surface having ridges 33 running in planes oriented perpendicular to the axis of the journal 28 and being complementary to the helical groove or threads 12 of the inner cylinder 10.

The diameter of the profiled rolling body 31 is selected such that its ridges 33 engage with the grooves 12 of the inner casing 11. A double eccentric plate 26 is attached to the outer end of the journal 28, said plate carrying a second journal or pin 29 diametrically opposite the first journal 28, and at the same distance e from the centre line 24, said journal 29 carrying a second profiled rolling body 32 which is similar to the body 31. A stop washer 27 is attached to the outer end of the journal 29, so that the rolling body 32 is axially retained between it and the double eccentric plate 26.

The profiled roller 32 engages with the helical groove 12 of the inner casing 11 in a position diametrically opposite the engaging position of the roller 31. The dimensions of the parts described are selected such that the profiled rollers 31 and 32 engage with a suitable force in the grooves 12 of the inner casing 11.

When the drive shaft 23 rotates, the profiled rollers 31 and 32 will follow or roll in the grooves of the inner casing 11 such that when the shaft 23 has turned one revolution in relation to the casing 11, the rollers will have displaced the inner casing a distance corresponding to one pitch of the helical groove 12. During this displacement, the inner cylinder 10 and the outer cylinder 1 will also have been displaced a pitch axially and linearly in relation to each other but without any mutual turning or rotation.

The described embodiment allows the selection of a very small pitch for the groove 12, down to one mm or less per revolution, and thus allows a very large gear reduction between the rotary movement and linear movement. This means, for example, that the neck 21 can normally be connected directly to the rotary driving power source.

By pretensioning the rollers 31 and 32 axially and/or radially in relation to each other, by means of adjusting washers or sprung resilient elements, any play in the translating apparatus can be completely removed and very great positional accuracy obtained, which is necessary, e.g. for positioning movements in machine tools.

FIG. 2 is a cross sectional view taken along the line II—II in FIG. 1, illustrating the outer casing 2 and inner casing 11 with its helical groove 12. Also illustrated are the drive shaft 23 with attached eccentric plate 23 and journal 28, as well as the profiled roller 31, rotatably mounted but axially fixed on the journal 28. Finally, the double eccentric plate 26 connecting journals 28 and 29, with the profiled roller 32 on the journal 29 carried by the plate 26 are also illustrated. The eccentricity e between the centre line 24 of the drive shaft and the centre lines of the journals 28 and 29 is given to the left in FIG. 2. FIG. 2 also illustrates how engagement between the grooves 12 and the ridges 33 of the profiled rollers 31 and 32 occurs along approximately segment-shaped surfaces, defined by circular lines with radii corresponding to the least diameter of the groove 12 and the greatest diameter of the profiled rollers 31 and 32.

As is apparent from the above, the ridges or threads 33 of the profiled rollers 31 and 32 are contained in planes perpendicular to the axes of the journals 28 and 29, and therefore also perpendicular to the axis of the inner cylindrical surface and centre line of the inner casing 11. The grooves 12, engaged by the ridges 33 of the rollers 31, 32, form an angle to the centre line of the inner casing 11, this angle depending on the pitch of the helical groove, and there is the same angle between groove 12 and the ridges 33 of the rollers 31, 32. To obtain correct engagement, the ridges 33 of the profiled rollers 31, 32 must be given a suitable profile, or the journals 28, 29 can be skewed with the pitch angle of the grooves 12 so that the ridges 33 and groove 12 are in the same plane.

A particularly favourable embodiment with good engaging surfaces is obtained if the profiled rollers are made with a large diameter in relation to the inner casing 11 and if the eccentricity is made small. Such an embodiment is apparent from FIG. 3, showing the outmost profiled roller 40 of a driving system 20 with profiled rollers in the form of rolling bearings, the outer ring being formed with ridges in planes parallel to the plane of the rolling bearing. The bearing is mounted on an eccentric sleeve 41 on the shaft 23 such that the sleeve is fixed to the shaft and has an eccentricity e' (which is small) between the centre lines of the shaft 23 and the centre line of the journal/eccentric sleeve. A small gap 44 thus occurs between the bearing 40 and the groove 12 in the inner sleeve 11. It is also apparent from FIG. 3 that upwardly the crests of the ridges or threads on the roller 40 lie at the roots of the threads or grooves 12, whereas they are directly opposite the crests thereof on the diametrically opposite side. This is because of the condition, described several times above, that the grooves 12 have a helical pitch while the ridges 33 on the rollers have no pitch at all.

FIG. 4 is a cross section through an apparatus where there are three profiled rollers 40, of the embodiment with ball bearings illustrated in FIG. 3, evenly distributed round the drive shaft 23. In the Figure can be seen the outer casing 2, inner casing 11 with helical grooves or threads 12, the bearing 40 with its centre 42, eccentric sleeve 41, drive shaft 23 with centre 24 and eccentricity e' between centres 24 and 42. Lines 45, through both these centres for the three different profiled rollers 40, are evenly angularly spaced at an angle of 120° about the shaft 23, as is apparent from FIG. 4.

FIG. 5 finally illustrates an embodiment of a roller in the form of a rolling bearing, where the ridges 33 are formed on a separate ring 47 pressed or forced fit onto the outer ring of the bearing.

The embodiments of the invention in which an exclusive property or privilege is claimed are defined as follows:

1. In a device for translating a rotary movement into a linear movement comprising an elongated cylinder having an internal thread, and a rotatable drive shaft, an associated end of which having a roller body assembly thereon cooperating with said internal thread so that when a relative rotation occurs between said cylinder and said shaft, said parts are displaced in the longitudinal direction in relation to each other, said roller body assembly comprising at least two cylindrical roller bodies axially spaced along the length of said drive shaft and the axes of rotation of which are radially spaced from the axis of said drive shaft and from each other, the outer surfaces of which being provided with ridges extending in planes oriented at right angles to said axis of rotation of each said roller body, the improvement comprising wherein said roller bodies are each of a diameter that closely corresponds to the internal diameter of said cylinder between the edges of said internal thread, and wherein said roller bodies constitute a support for the associated end of said drive shaft.

2. The device as claimed in claim 1, wherein said roller bodies are eccentrically journalled on said drive shaft by an eccentric sleeve.

3. The device as claimed in claim 1 or claim 2, wherein an outer cylinder is provided which is telescopically displaceable and nonrotatable, said outer cylinder surrounding said cylinder provided with said internal thread, and wherein the end of said drive shaft opposite to said associated end with said roller body assembly is rotatably but axially fixedly journalled in an end wall of said outer cylinder.

* * * * *